(12) United States Patent
Fujibayashi

(10) Patent No.: US 8,039,166 B2
(45) Date of Patent: Oct. 18, 2011

(54) POLYMER ELECTROLYTE MEMBRANE FOR FUEL CELL, METHOD OF MANUFACTURING THE SAME, AND FUEL CELL EMPLOYING THE SAME

(75) Inventor: Fusaki Fujibayashi, Yokohama-si (JP)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 925 days.

(21) Appl. No.: 11/936,226

(22) Filed: Nov. 7, 2007

(65) Prior Publication Data

US 2008/0152986 A1   Jun. 26, 2008

(30) Foreign Application Priority Data

Dec. 20, 2006   (JP) ................................ 2006-342826
Jun. 5, 2007    (KR) ......................... 10-2007-0055250

(51) Int. Cl.
*H01M 8/10*   (2006.01)
*C08J 5/22*   (2006.01)

(52) U.S. Cl. ........................................ 429/492; 521/27

(58) Field of Classification Search .................. 429/492; 521/25, 27
See application file for complete search history.

(56) References Cited

U.S. PATENT DOCUMENTS

| | | | |
|---|---|---|---|
| 3,313,783 A | 4/1967 | Iwakura et al. | |
| 3,509,108 A | 4/1970 | Prince et al. | |
| 3,555,389 A | 1/1971 | Opal | |
| 5,525,436 A | 6/1996 | Savinell et al. | |
| 7,736,782 B2 * | 6/2010 | Aihara et al. | 521/27 X |
| 2005/0118476 A1 * | 6/2005 | Melzner et al. | 521/27 X |
| 2007/0003808 A1 * | 1/2007 | Melzner et al. | 521/27 X |
| 2007/0184323 A1 * | 8/2007 | Lee et al. | 521/27 X |

FOREIGN PATENT DOCUMENTS

| | | |
|---|---|---|
| JP | 2000-281819 | 10/2000 |
| JP | 2005-535734 | 11/2005 |

* cited by examiner

*Primary Examiner* — Stepehn J. Kalafut
(74) *Attorney, Agent, or Firm* — Lee & Morse, P.C.

(57) ABSTRACT

A polymer electrolyte membrane for a fuel cell that can maintain a stable performance for a long time, a method of manufacturing the same, and a fuel cell employing the same. The polymer electrolyte membrane includes at least one kind of a basic polymer and an acidic dopant. A dimensional change in the planar direction of the electrolyte membrane between a wet state and a dry state is 5% or less.

15 Claims, 3 Drawing Sheets

POLYMER ELECTROLYTE MEMBRANE FOR FUEL CELL, METHOD OF MANUFACTURING THE SAME, AND FUEL CELL EMPLOYING THE SAME

CROSS-REFERENCE TO RELATED APPLICATIONS

This application claims the benefits of Japanese Patent Application No. 2006-342826, filed Dec. 20, 2006, in the Japanese Patent Office, and Korean Patent Application No. 2007-55250, filed Jun. 5, 2007, in the Korean Intellectual Property Office, the disclosures of which are incorporated herein by reference.

BACKGROUND OF THE INVENTION

1. Field of the Invention

Aspects of the present invention relate to a polymer electrolyte membrane for a fuel cell, a method of manufacturing the same, and a fuel cell employing the same. More particularly, aspects of the present invention relate to a polymer electrolyte membrane having excellent durability and that is adapted for a fuel cell that is operated at a temperature range of 100 to 200° C. without using a particular fuel gas humidifier, a method of manufacturing the same, and a fuel cell employing the same.

2. Description of the Related Art

Polymer electrolyte membranes used in solid polymer fuel cells require high ionic conductivity, and at the same time, good long-term stability. U.S. Pat. No. 5,525,436 discloses an electrolyte membrane in which a polybenzimidazole film is doped with an orthophosphoric acid. Japanese Patent Laid-Open Publication No. 2000-281819 discloses a polymer electrolyte membrane having an improved mechanical strength, in which polybenzimidazoles are crosslinked by diepoxy compounds or the like. Japanese Patent Publication No. 2005-535734 discloses an electrolyte membrane in which a polymer blend including polybenzimidazoles is crosslinked by diepoxy compounds or the like. In summary, U.S. Pat. No. 5,525,436, Japanese Patent Laid-Open Publication No. 2000-281819, and Japanese Patent Publication No. 2005-535734 relate to electrolyte membranes in which polybenzimidazoles, which are basic polymers, are impregnated with a dopant (e.g., an orthophosphoric acid). Membrane and electrode assemblies employing these electrolyte membranes tend to be unsatisfactory in view of long-term stability. The electrolyte membranes disclosed in Japanese Patent Laid-Open Publication No. 2000-281819 and Japanese Patent Publication No. 2005-535734 have an improved mechanical strength provided by adding a crosslinking agent, but the long term stability of these membranes nevertheless tends to be insufficient. The cause of the lack of long term stability is that these kinds of electrolyte membranes undergo a large dimensional change between the wet state (moisture absorption state) and the dry state.

That is, an electrolyte membrane that includes a large amount of an acidic dopant exists in a wet state due to product water when a fuel cell containing the electrolyte membrane is in a closed circuit state, but the electrolyte membrane exists in a dry state due to leakage of water from the electrolyte membrane when the fuel cell is in an open circuit state or is operating at a low current density.

Due to absorption and desorption of water between the wet state and dry state of an electrolyte membrane, the electrolyte membrane undergoes a dimensional change. In particular, an electrolyte membrane, the edges of which are fixed in a cell, is subjected to tensile stress due to a dimensional change in the planar direction. In order to solve this problem, a method of enhancing the yield strength or fracture strength of an electrolyte membrane has been proposed, but there is much room for improvement.

SUMMARY OF THE INVENTION

Aspects of the present invention provide a polymer electrolyte membrane for a fuel cell that can maintain stable performance for a long time, a method of manufacturing the same, and a fuel cell employing the same.

While searching for a method of improving the long-term stability of an electrolyte membrane, the present inventors have found that a membrane and electrode assembly employing an electrolyte membrane undergoing an undesirably large dimensional change between the wet state and the dry state cannot maintain stable performance for a long time.

In more detail, in stress-distortion tests for most polymer membranes or electrolyte membranes, it is found that a yield point exists at elongation of about 10% or less. Thus, if elongation exceeds 5%, plastic deformation starts to appear. For this reason, if a dimensional change in the planar direction of an electrolyte membrane between the wet state and the dry state exceeds 5%, the electrolyte membrane is subjected to plastic deformation and has a high likelihood of being finely cracked or fractured.

It is thought that one occurrence of slight plastic deformation does not significantly affect the long-term durability of an electrolyte membrane. However, slight plastic deformation can repeatedly occur in an electrolyte membrane for a fuel cell according to the operating conditions of the fuel cell. The repetition of plastic deformation easily causes fatigue accumulation, and in the long run, there is a high likelihood of an extreme increase in the fracture of the electrolyte membrane or a crossover of fuel through the membrane.

In summary, if a dimensional change between the wet state and dry state of an electrolyte membrane exceeds 5%, a membrane and electrode assembly employing the electrolyte membrane may not maintain stable performance for a long time.

According to an embodiment of the present invention, there is provided a polymer electrolyte membrane for a fuel cell, the polymer electrolyte membrane including a basic polymer and an acidic dopant, wherein a dimensional change in a planar direction of the polymer electrolyte membrane between a wet state and a dry state is 5% or less.

In the polymer electrolyte membrane according to an aspect of the present invention, the basic polymer may include a polybenzimidazole or a derivative thereof.

In the polymer electrolyte membrane according to an aspect of the present invention, the basic polymer may include a crosslinked polybenzimidazole obtained by reacting polybenzimidazole with a polyfunctional crosslinking agent or a derivative thereof.

In the polymer electrolyte membrane according to an aspect of the present invention, the basic polymer may include a polybenzimidazole crosslinked by an epoxy group-containing alkoxysilane or a derivative thereof.

In the polymer electrolyte membrane according to an aspect of the present invention, the acidic dopant may include a phosphoric acid or an organic phosphonic acid.

According to another embodiment of the present invention, there is provided a method of manufacturing a polymer electrolyte membrane for a fuel cell, the method including: adding a basic polymer and a polyfunctional crosslinking agent to an organic solvent and introducing the polyfunctional crosslinking agent into the basic polymer to obtain a polymer solution including the polyfunctional crosslinking agent-containing basic polymer; removing the organic solvent from the polymer solution and performing a condensation reaction of the polyfunctional crosslinking agent so that the basic polymer is crosslinked to obtain a polymer membrane; and impregnating the polymer membrane with an acidic dopant at room temperature (20° C.) to 200° C. to obtain a polymer electrolyte membrane.

According to another embodiment of the present invention, there is provided a method of manufacturing a polymer electrolyte membrane for a fuel cell, the method including: adding a basic polymer and a polyfunctional crosslinking agent to an organic solvent and crosslinking the basic polymer by the polyfunctional crosslinking agent to obtain a cross-linked polymer solution; removing the organic solvent from the cross-linked polymer solution to obtain a polymer membrane; and impregnating the polymer membrane with an acidic dopant at room temperature to 200° C. to obtain a polymer electrolyte membrane.

In the method of manufacturing the polymer electrolyte membrane according to an aspect of the present invention, the basic polymers may include a polybenzimidazole or a derivative thereof, and the polyfunctional crosslinking agent may be an epoxy group-containing alkoxysilane.

In the method of manufacturing the polymer electrolyte membrane according to an aspect of the present invention, the basic polymer may include a polybenzimidazole or a derivative thereof, and the polyfunctional crosslinking agent may be 1,4-butanediol digycidyl ether.

According to another embodiment of the present invention, there is provided a membrane electrode assembly including a pair of catalyst layers and an electrolyte membrane disposed between the catalyst layers, the electrolyte membrane being the above-described polymer electrolyte membrane.

According to another embodiment of the present invention, there is provided a fuel cell including a plurality of membrane electrode assemblies as described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3A is a graph illustrating the output voltage and output current of a fuel cell with respect to an operating time, and FIG. 3B is a graph illustrating an open circuit voltage with respect to a test time.

DETAILED DESCRIPTION OF THE EMBODIMENTS

Figure 1:
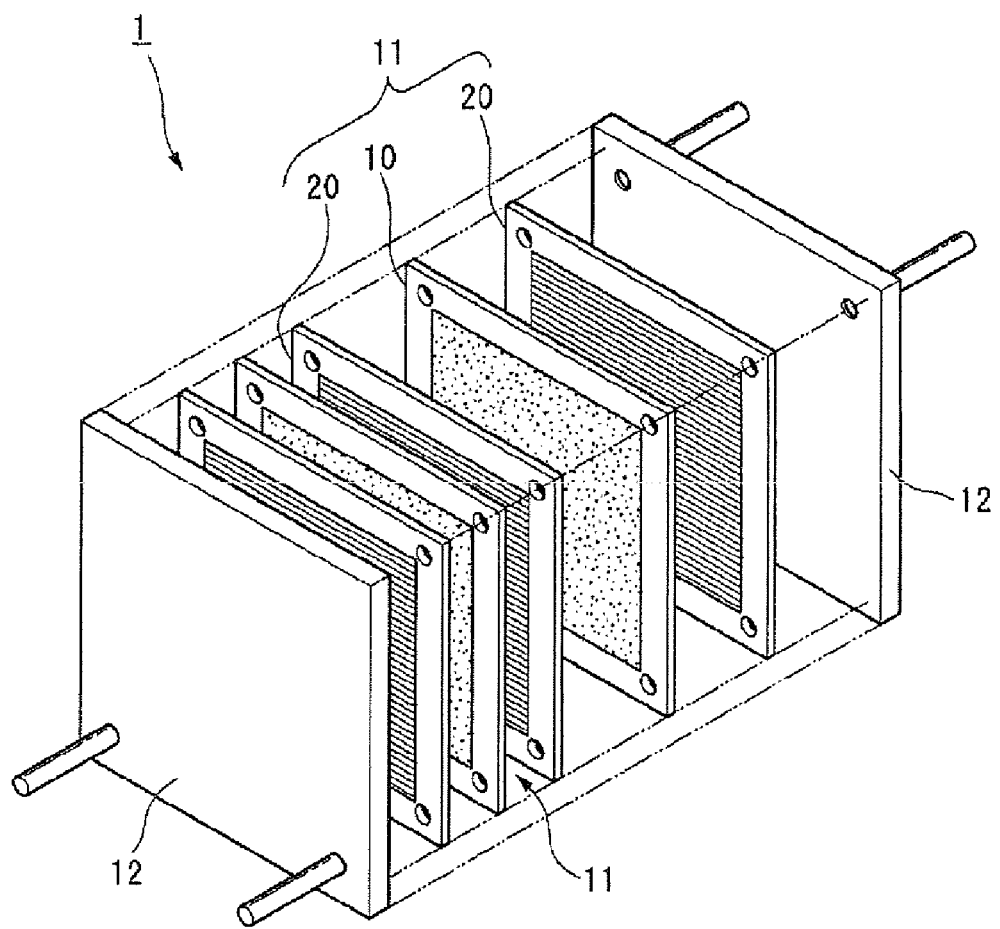
FIG. 1 is an exploded perspective view illustrating parts of a fuel cell according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention will now be described more fully with reference to the accompanying drawings, in which exemplary embodiments of the invention are shown. FIG. 1 is an exploded perspective view illustrating a fuel cell according to an embodiment of the present invention, and FIG. 2 is a sectional diagram illustrating a membrane and electrode assembly included in the fuel cell of FIG. 1.

Referring to FIG. 1, a fuel cell 1 is schematically structured such that two unit cells (11 for each) are arranged in a region defined by a pair of holders (12 for each). Each unit cell 11 includes a membrane electrode assembly 10, and bipolar plates (20 for each) arranged on respective sides of the thickness direction of the membrane electrode assembly 10. The bipolar plates 20 are made of a conductive metal or carbon, and are adhered to both sides of the membrane electrode assembly 10. Thus, the bipolar plates 20 act as current collectors, and at the same time, supply oxygen and fuel to catalyst layers of the membrane electrode assembly 10.

FIG. 1 illustrates that the fuel cell 1 includes two unit cells, but the number of unit cells is not limited to two. According to characteristics required for fuel cells, several tens to several hundreds of unit cells may be used.

Figure 2:
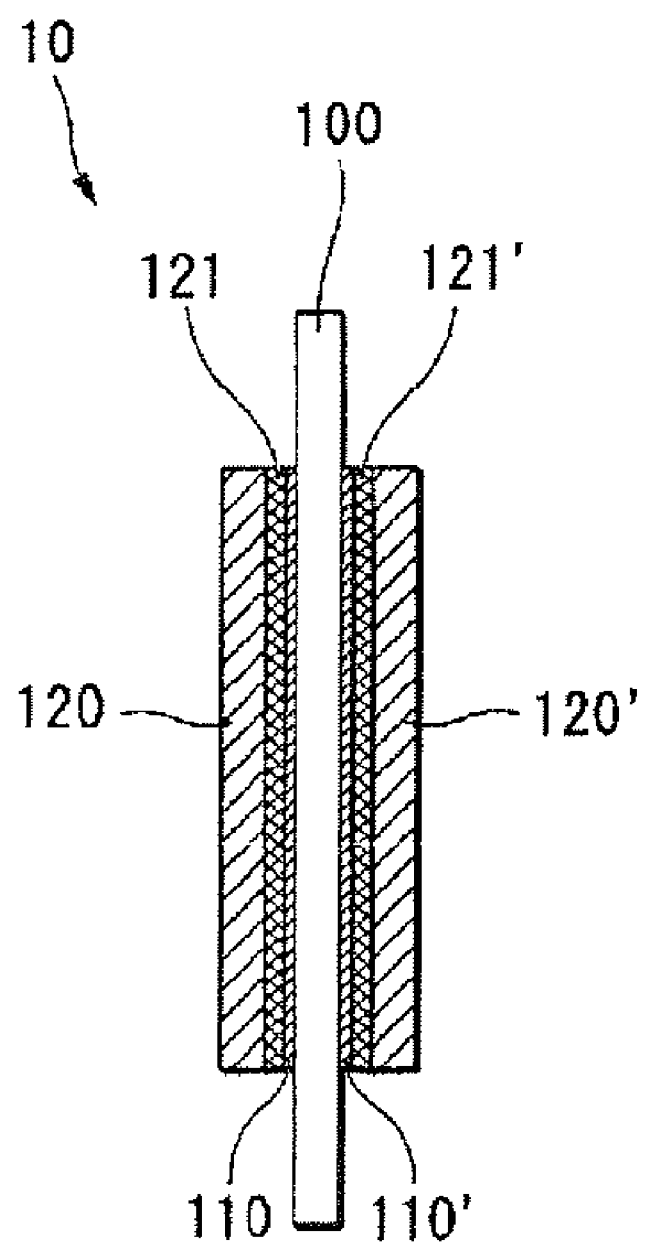
FIG. 2 is a sectional diagram illustrating a membrane and electrode assembly included in the fuel cell of FIG. 1.

Referring to FIG. 2, together with FIG. 1, the membrane electrode assembly 10 includes a polymer electrolyte membrane (hereinafter, referred to as the "electrolyte membrane") 100 for a fuel cell according to an embodiment of the present invention, catalyst layers 110 and 110' disposed on respective sides of the thickness direction of the electrolyte membrane 100, first gas diffusion layers 121 and 121' disposed on respective sides of the catalyst layers 110 and 110', and second gas diffusion layers 120 and 120' disposed on respective sides of the first gas diffusion layers 121 and 121'.

The catalyst layers 110 and 110' serve as a fuel electrode and an oxygen electrode, and each catalyst layer is formed of a catalyst material, such as activated carbon, and a binder solidifying the catalyst material. The binder may be a fluorine resin having excellent heat resistance or a material that is the same as the material that forms the electrolyte membrane 100. When the material that forms the electrolyte membrane 100 is used as the binder, the diffusion of protons in the catalyst layers 110 and 110' can be efficiently performed, and the impedance of the catalyst layers 110 and 110' is lowered, thereby enhancing the output of the fuel cell 1. As will be described later, the electrolyte membrane 100 according to aspects of the present invention shows only a slight dimensional change. Thus, the catalyst layers 110 and 110' including the material that forms the electrolyte membrane 100 also shows only a slight morphological change and thus, has excellent long-term stability.

The first gas diffusion layers 121 and 121' and the second gas diffusion layers 120 and 120' may be formed of a carbon sheet or the like and diffuse oxygen and fuel supplied through the bipolar plates 20 into the entire surfaces of the catalyst layers 110 and 110'.

The fuel cell 1 including the membrane and electrode assembly 10 is operated at a temperature of 100 to 300° C. Fuel, e.g. hydrogen, is supplied to one of the catalyst layers 110 and 110' via one of the bipolar plates 20, and an oxidizing agent, e.g., oxygen, is supplied to the other catalyst layer via the other bipolar plate. In the catalyst layer receiving the hydrogen, the hydrogen is oxidized to produce protons, and the protons migrate to the other catalyst layer via the electrolyte membrane 100. In the catalyst layer receiving the protons, the protons and the oxygen react electrochemically to produce water, generating an electrical energy.

The hydrogen used as the fuel may be hydrogen generated by reforming a hydrocarbon or an alcohol, and the oxygen used as the oxidizing agent may be supplied as an oxygen-containing air.

Hereinafter, the electrolyte membrane 100 included in the membrane and electrode assembly 10 will be described. An electrolyte membrane according to aspects of the present invention includes at least one kind of a basic polymer and an acidic dopant, and a dimensional change in the planar direction of the electrolyte membrane as the electrolyte membrane changes from the wet state to the dry state is 5% or less. As a non-limiting example, the dimensional change may be 4% or less.

The basic polymer constituting the electrolyte membrane may be polybenzimidazole or a derivative thereof, or a crosslinked polybenzimidazole obtained by crosslinking the polybenzimidazole with a polyfunctional crosslinking agent or a derivative thereof.

Polybenzimidazoles or derivatives thereof (hereinafter, referred to as "polybenzimidazoles") are a major component for forming an electrolyte membrane according to aspects of the present invention. The polybenzimidazole serves to constantly maintain the shape of an electrolyte membrane. According to aspects of the present invention, an electrolyte membrane is obtained by impregnating a polybenzimidazole film with an acidic dopant. Polybenzimidazoles have excellent heat resistance, and at the same time, when impregnated with an acidic dopant, can retain a large amount of the dopant, and thus, are suitable as a component of an electrolyte membrane for a fuel cell.

The polybenzimidazole used herein may be a polymer represented by (a)-(d) of Formula 1 below or derivatives thereof:

<Formula 1>

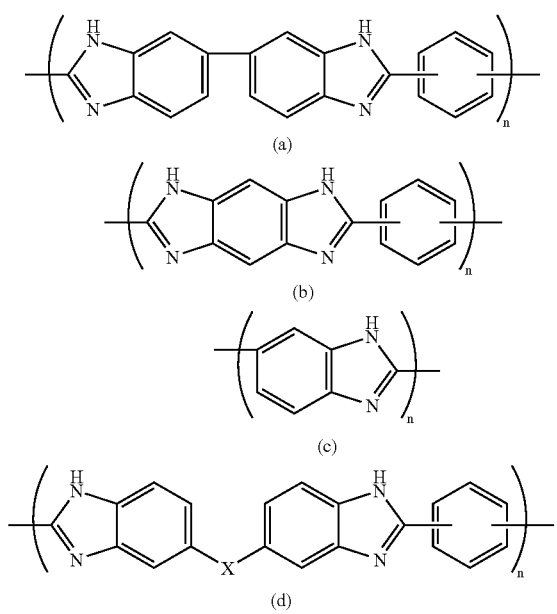

In (a)-(d) of Formula 1, n is the number of repeating units and is 10 to 100,000. In (d), X is at least one selected from the group consisting of —O—, —SO$_2$—, —S—, —CO—, —C(CH$_3$)$_2$—, and —C(CF$_3$)$_2$—. When n is 10 or more, the mechanical strength of the polybenzimidazole is enhanced, thereby forming an electrolyte membrane with excellent strength. When n is 100,000 or less, the solubility of the polybenzimidazole in an organic solvent is good, thus enhancing the formability of the polybenzimidazole and increasing the degree of freedom in shape of an electrolyte membrane. Furthermore, at least one functional group selected from a sulfonic acid group and a phosphonic acid group or a derivative including the functional group may be bound to a polybenzimidazole (a)-(d) of Formula 1.

The polybenzimidazole can be prepared by a method known in the art. For example, preparation methods disclosed in U.S. Pat. Nos. 3,313,783, 3,509,108, and 3,555,389 may be used.

As a non-limiting example, the polybenzimidazole may be crosslinked by a polyfunctional crosslinking agent. As non-limiting examples, the polyfunctional crosslinking agent may be 1,4-butanediol diglycidyl ether and/or an epoxy group-containing alkoxysilane. As a particular non-limiting example, the polyfunctional crosslinking agent may be an epoxy group-containing alkoxysilane. These polyfunctional crosslinking agents include an epoxy group (a glycidyl group) in their molecules, and the epoxy group binds to the basic polymer. For example, the epoxy group-containing alkoxysilane may be 3-glycidyl oxypropyl trimethoxysilane.

When using a polyfunctional crosslinking agent including a plurality of epoxy groups in its molecule, adjacent main chains of the polybenzimidazole are crosslinked to each other.

When using an epoxy group-containing alkoxysilane including an epoxy group and an alkoxy group in its molecule, the epoxy group reacts with the main chain of the polybenzimidazole to introduce an epoxy group-containing alkoxysilane to the main chain of the polybenzimidazoles. Then, the epoxy group-containing alkoxysilane introduced to the main chain of the polybenzimidazole is subjected to a condensation reaction, so that main chains of adjacent polybenzimidazoles are crosslinked to each other.

When a silane-based compound is used as a crosslinking agent, a dimensional change of an electrolyte membrane can be significantly reduced, and the heat resistance of the electrolyte membrane can be further enhanced.

A dimensional change in the planar direction of an electrolyte membrane according to aspects of the present invention as the electrolyte membrane changes from the wet state to the dry state may be 5% or less, or as a more specific, non-limiting example, may be 4% or less. A dimensional change of 4% or less can be achieved by adjusting the ratio of the polyfunctional crosslinking agent to the basic polymer.

The content of the polyfunctional crosslinking agent may be 3 to 11 wt % based on the total weight of a polymer membrane forming composition, considering the electrochemical performance of an electrolyte membrane.

When 1,4-butanedioldiglycidylether is used as the polyfunctional crosslinking agent, the amount of the polyfunctional crosslinking agent may be 3 to 11 wt % based on the total weight of a polymer membrane forming composition. If the amount of the polyfunctional crosslinking agent is less than 3 wt %, a dimensional change as an electrolyte membrane changes from the wet state to the dry state may be too large. If the content of the polyfunctional crosslinking agent exceeds 11 wt %, the electrochemical performance of the electrolyte membrane may be lowered.

When epoxy group-containing alkoxysilane such as 3-glycidyloxypropyl trimethoxysilane is used as the polyfunctional crosslinking agent, the content of the polyfunctional crosslinking agent may be 3 to 7 wt %. If the content of the polyfunctional crosslinking agent is less than 3 wt %, a dimensional change as an electrolyte membrane changes from the wet state to the dry state may be too large. If the content of the polyfunctional crosslinking agent exceeds 7 wt %, the electrochemical performance of the electrolyte membrane may be lowered.

The acidic dopant may be a phosphoric acid or an organic phosphonic acid. As non-limiting examples, the phosphoric acid may be a metaphosphoric acid, an orthophosphoric acid, a paraphosphoric acid, a triphosphoric acid, a tetraphosphoric acid, or the like. As a specific, non-limiting example, the phosphoric acid may be orthophosphoric acid As non-limiting examples, the organic phosphonic acid may be an alkylphosphonic acid such as a methylphosphonic acid, an ethylphosphonic acid, or a propylphosphonic acid; a vinylphosphonic acid; or a phenylphosphonic acid. As a specific, non-limiting example, the organic phosphonic acid may be vinylphosphonic acid.

Herein, where the terms such as "a basic polymer," "a polybenzimidazole," "a polyfunctional crosslinking agent," "an acidic dopant," or the like are used, it is to be understood that more than one basic polymer, polybenzimidazole, polyfunctional crosslinking agent, acidic dopant, etc., can be present.

The rate of impregnation (doped amount) of the acidic dopant to the polybenzimidazole may be 20 to 2,000 mol %, more preferably 50 to 1,500 mol %, based on the repeating units of the polybenzimidazole. When the rate of impregnation of the acidic dopant is 20 mol % or more, the proton conductivity of the electrolyte membrane is sufficiently high, and when the electrolyte membrane is inserted for forming a fuel cell, the resultant fuel cell can show good electricity generation characteristics. When the rate of impregnation of the acidic dopant is 2,000 mol % or less, the rate of impregnation of the acidic dopant to the polybenzimidazole is not excessive, dissolution of the polybenzimidazole does not occur, and proton conductivity can be stably maintained for a long time.

As an electrolyte membrane according to aspects of the present invention changes from the wet state to the dry state, a dimensional change in the planar direction of the electrolyte membrane may be 5% or less. As a non-limiting example, the dimensional change may be 4% or less. When the dimensional change of the electrolyte membrane is 5% or less, the performance of a membrane and electrode assembly can be stably maintained for a long time. That is, when the dimensional change of the electrolyte membrane is 5% or less, as the electrolyte membrane changes from the wet state to the dry state, plastic deformation does not occur, and the occurrence of fine cracks or fractures in the electrolyte membrane is prevented. Moreover, even though slight plastic deformation repeatedly occurs in the electrolyte membrane according to the operating conditions of a fuel cell, fatigue accumulation does not occur, and in the long run, it is possible to lower the likelihood of an extreme fracture of the electrolyte membrane or a crossover of fuel through the electrolyte membrane.

A method of adjusting a dimensional change in the planar direction of an electrolyte membrane between the wet state and the dry state to be 5% or less is not particularly limited. The method can be appropriately selected by considering the molecular structure of the basic polymer constituting the electrolyte membrane and the combination of the basic polymer with the acidic dopant, with proviso that various characteristics (e.g., ionic conductivity, handling property) of the electrolyte membrane are not damaged.

For example, in order to introduce a crosslinked structure to a basic polymer, a crosslinking agent commonly known in the art, e.g., 1,4-butanediol diglycidyl ether may be used. In this case, the dimensional change of an electrolyte membrane can be adjusted to be 5% or less by appropriately selecting the type of acidic dopant and a reaction temperature, with proviso that various characteristics (e.g., ionic conductivity, handling property) of the electrolyte membrane are not damaged.

In particular, according to aspects of the present invention, in order to introduce a crosslinked structure to a basic polymer, instead of directly crosslinking the basic polymer using a polyfunctional crosslinking agent, the following two-step process can be performed considering a process of manufacturing an electrolyte membrane. That is, a crosslinkable property is imparted to basic polymer, and a crosslinking reaction is then performed during the manufacture of an electrolyte membrane. For example, a basic polymer can be reacted with epoxy group-containing alkoxysilanes to impart a crosslinkable property to the basic polymer, and the reacted basic polymer can then be subjected to a hydrolysis and condensation reaction to thereby introduce a crosslinked structure into the basic polymer.

When using an uncrosslinked basic polymer, it is preferable to select a molecular structure having a polymer chain with relatively high plane orientation characteristics, e.g., a molecular structure in which a sulfonyl group or an ether group is introduced into the main chain or a phosphonyl group is introduced into a benzene ring. Of course, in this case, the dimensional change of an electrolyte membrane can be adjusted to 5% or less by appropriately selecting the type of an acidic dopant and a reaction temperature, with proviso that various characteristics (e.g., ionic conductivity, handling property) of the electrolyte membrane are not damaged.

As used herein, the term "electrolyte membrane in a wet state" refers to an electrolyte membrane in which a polybenzimidazole or crosslinked polybenzimidazole crosslinked by a polyfunctional crosslinking agent is impregnated with an acidic dopant, and further, is impregnated with water. An electrolyte membrane in a wet state is swollen by an acidic dopant and water, and the dimension of the planar direction of the electrolyte membrane is increased.

As used herein, the term "electrolyte membrane in a dry state" refers to an electrolyte membrane in which a polybenzimidazole or crosslinked polybenzimidazole crosslinked by a polyfunctional crosslinking agent is impregnated with an acidic dopant, but is not impregnated with water. An electrolyte membrane in a dry state is swollen by an acidic dopant, and the dimension of the planar direction of the electrolyte membrane is smaller than that of the electrolyte membrane in a wet state.

For example, an electrolyte membrane in a wet state is obtained by impregnating a polybenzimidazole or crosslinked polybenzimidazole crosslinked by a polyfunctional crosslinking agent with an orthophosphoric acid (purity: 85 wt %). The orthophosphoric acid contains 15 wt % of water. The water, together with the orthophosphoric acid, is impregnated in the polybenzimidazoles to obtain an electrolyte membrane in a wet state.

In addition, when the generation of electricity is performed by connecting an external load to a fuel cell, water is produced and impregnated in an electrolyte membrane. At this time, the electrolyte membrane is referred to as being in a wet state.

Meanwhile, an electrolyte membrane in a dry state may be obtained by vacuum-drying an electrolyte membrane in a wet state under a reduced pressure of e.g., 1 mmHg or less, at 60° C. for 24 hours.

In addition, when a current for electricity generation is almost zero (0) A with no connection of an external load to a fuel cell, and a fuel gas (e.g., hydrogen) and an oxidizing gas (e.g., oxygen or air) are left with flow, an electrolyte membrane is dried by the fuel gas and the oxidizing gas, and water is removed from the electrolyte membrane. At this time, the electrolyte membrane is referred to as being in a dry state.

Hereinafter, a method of manufacturing an electrolyte membrane according to aspects of the present invention will be described. A method of manufacturing an electrolyte membrane according to aspects of the present invention can be performed by a one-step crosslinking process or a two-step crosslinking process as described above.

When performing a one-step crosslinking process, 1,4-butanediol diglycidyl ether may be used as a polyfunctional crosslinking agent. In detail, a basic polymer and a polyfunctional crosslinking agent are first added to an organic solvent to obtain a mixed solution. The basic polymer may be a polybenzimidazole, and the organic solvent may be N,N-dimethylacetamide, dimethylformamide, dimethylsulfamide, N-methyl-2-pyrrolidone, or the like.

When the mixed solution is heated, the organic solvent is removed from the mixed solution, and at the same time, a crosslinking reaction is performed. As a non-limiting example, the heating may be performed at 120-180° C. for 5 minutes to 2 hours. As a result, a polymer membrane is obtained. Then, the polymer membrane is impregnated with an acidic dopant in an environment of room temperature to 200° C. to thereby obtain an electrolyte membrane.

When performing a two-step crosslinking process, epoxy group-containing alkoxysilane may be used as a polyfunctional crosslinking agent. In detail, a basic polymer and a polyfunctional crosslinking agent are added to an organic solvent, and an addition reaction of the polyfunctional crosslinking agent to the basic polymer is then performed to obtain a polymer solution. The addition reaction is achieved by performing the ring-opening of the epoxy groups of epoxy group-containing alkoxysilane. The basic polymer may be a polybenzimidazole, and the organic solvent may be N,N-dimethylacetamide, dimethylformamide, dimethylsulfamide, N-methyl-2-pyrrolidone, or the like. For example, the addition reaction may be performed in such a manner that the basic polymer and the polyfunctional crosslinking agent are added to the organic solvent, and the resultant solution is incubated at 50-80° C. for 5 minutes to 2 hours.

After the addition reaction, the organic solvent is removed from the polymer solution, and at the same time, the basic polymer is crosslinked by a condensation reaction of the polyfunctional crosslinking agent to thereby obtain a polymer membrane. Here, the condensation reaction is a reaction forming a siloxane bond by condensation between alkoxy groups of epoxy group-containing alkoxysilane. The removal of the organic solvent may be performed by heating at 120-180° C. for 5 minutes to 2 hours. By the heating, a condensation reaction between the polyfunctional crosslinking agent added to the basic polymer occurs, and thus, the basic polymer is crosslinked, thereby producing a polymer membrane.

The polymer membrane is then impregnated with an acidic dopant at an environment of room temperature to 200° C. to obtain an electrolyte membrane.

As described above, an electrolyte membrane according to aspects of the present invention shows a dimensional change of 5% or less. Thus, as the electrolyte membrane changes from a wet state to a dry state, significant plastic deformation does not occur, and the occurrence of slight cracks or fractures in the electrolyte membrane can be prevented. Furthermore, even though slight plastic deformation may occur repeatedly in the electrolyte membrane according to the operating conditions of a fuel cell, fatigue accumulation does not occur, and in the long run, it is possible to lower the likelihood of an extreme fracture of the electrolyte membrane or a crossover of fuel through the electrolyte membrane.

EXAMPLES

Various electrolyte membranes were manufactured, and dimensional change measurement and durability tests of the electrolyte membranes were performed as follows.

<Measurement of Dimensional Change>

Electrolyte membranes composed of basic polymers and acidic dopants were manufactured by impregnating the basic polymers with the acidic dopants selected considering the ionic conductivity and handling property of the electrolyte membranes, etc. The reaction conditions were selected considering the ionic conductivity and handling property of the electrolyte membranes, etc. For example, when impregnating a basic polymer with an orthophosphoric acid, the orthophosphoric acid may be maintained at room temperature to 60° C., and the impregnation time may be a period of time taken until the rate of impregnation of the orthophosphoric acid is maintained constant. After impregnation, the electrolyte membranes were in a wet state. A residual acid was wiped off from the electrolyte membranes, and dimensions of the two plane directions of the electrolyte membranes were measured. Then, the electrolyte membranes were vacuum-dried at 60° C. for 24 hours to remove water. At this time, the electrolyte membranes were in a dry state. The percentage of dimensional change in the two plane directions of each electrolyte membrane between the wet state and the dry state was measured, and the average values were calculated.

<Durability Test of Electrolyte Membranes>

Commercially available gas diffusion electrodes were adhered to electrolyte membranes as manufactured above to obtain membrane electrode assemblies with an effective area of 25 cm$^2$. The membrane electrode assemblies were inserted into unit cells, and the resultant fuel cells were operated with hydrogen/air to generate electricity. The operating temperature was 150° C. At a current density of 0.2 A/cm$^2$ or more, the operation was performed at a hydrogen gas utilization rate of 80% and an air utilization rate of 50%. At a current density of less than 0.2 A/cm$^2$, the operation was performed at constant gas flow rates.

Figure 3B:
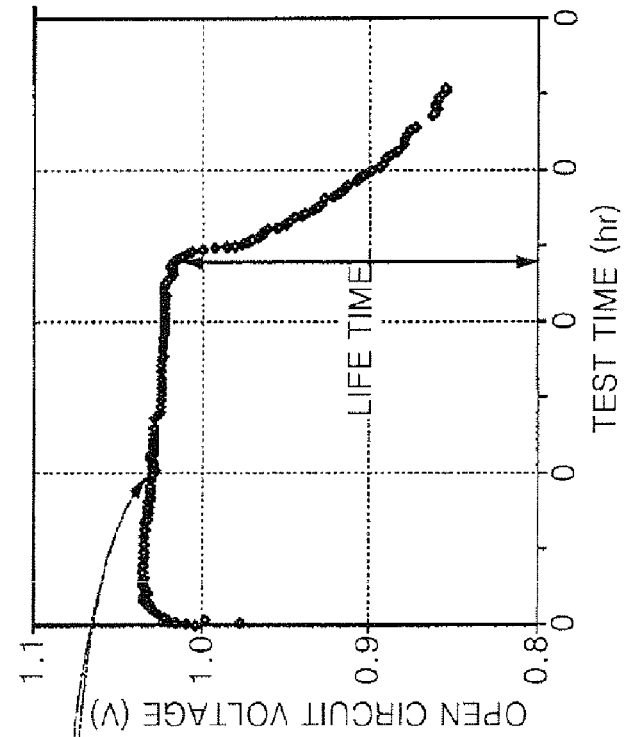
FIGS. 3A and 3B show the results of durability tests.
Figure 3A:
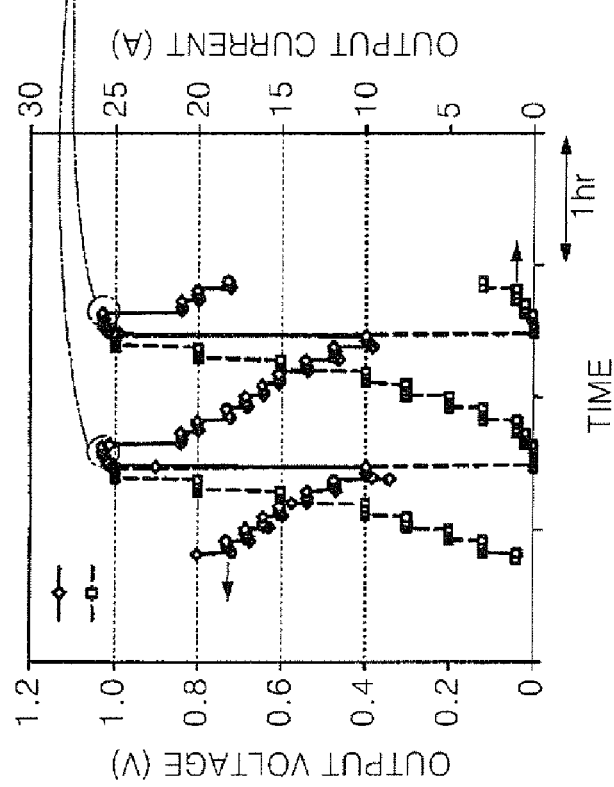

In order to change the electrolyte membranes into a dry state, the fuel cells were operated at an open circuit state. In order to change the electrolyte membranes into a wet state, the fuel cells were operated at a maximum current density of 0.6-1 A/cm$^2$. In order to repeatedly change the electrolyte membranes from the dry state to the wet state, the following procedure was repeated: the electrolyte membranes were maintained at an open circuit state for a predetermined time, and current scanning was then performed to reach the maximum current density. Then, the electrolyte membranes were maintained at an open circuit state for about 10 minutes in order to minimize an adverse effect due to a chemical change of the electrolyte membranes at an open circuit state, and the current scanning for reaching the maximum current density was performed for about 40 to 60 minutes in order to avoid problems such as gas supply shortage due to a rapid change in current. The output voltage and output current of the fuel cells with respect to an operating time are illustrated in FIG. 3A. The durability test was performed by repeating the pattern of FIG. 3A. In FIG. 3A, a plot represented by a solid line denotes an output voltage, and a plot represented by a dotted line denotes an output current.

For the durability test, in the relationship between an open circuit voltage obtained during the current scanning and the operating time, the time up to when an open circuit voltage starts to rapidly drop is designated as "endurance time". The test time was 1,000 hours, at which time the test was stopped. FIG. 3B is a graph illustrating an open circuit voltage with respect to an operating time. That is, FIG. 3B illustrates that an open circuit voltage starts to rapidly drop at about 240 hours.

Example 1

Electrolyte membranes in which a polybenzimidazole crosslinked by 1,4-butanediol diglycidyl ether used as a crosslinking agent was impregnated with 400 wt % of an orthophosphoric acid were manufactured as follows: 5 parts by weight of 1,4-butanediol diglycidyl ether were added to a solution of 10 wt % of poly-2,2'-(m-phenylene)-5,5'-bibenzimidazole represented by (a) of Formula 1 above in N,N-diacetamide to obtain a mixed solution. The mixed solution was cast onto glass substrates and heated at 150° C. for five hours to remove the organic solvent and to induce a crosslinking reaction. As a result, polymer membranes were obtained. The polymer membranes were impregnated with an orthophosphoric acid having a purity of 85 wt % at room temperature for one hour to thereby manufacture electrolyte membranes.

The dimensional change of the electrolyte membranes was 4% as measured. Durability tests of the electrolyte membranes were also performed. The endurance time of the electrolyte membranes was 750 hours.

Example 2

Electrolyte membranes in which a polybenzimidazole crosslinked by 1,4-butanediol diglycidyl ether used as a crosslinking agent was impregnated with 120 wt % of an ethylphosphonic acid were manufactured as follows: 10 parts by weight of 1,4-butanediol diglycidyl ether were added to a solution of 10 wt % of poly-2,2'-(m-phenylene)-5,5'-bibenzimidazole represented by (a) of Formula 1 above in N,N-diacetamide to obtain a mixed solution. The mixed solution was cast onto glass substrates and heated at 150° C. for five hours to remove the organic solvent and to induce a crosslinking reaction. As a result, polymer membranes were obtained. The polymer membranes were impregnated with an ethylphosphonic acid having a purity of 85 wt % and that had been heated at 120° C., for five hours to thereby manufacture electrolyte membranes.

The dimensional change of the electrolyte membranes was 0% as measured. Durability tests of the electrolyte membranes were also performed. The endurance time of the electrolyte membranes was 950 hours.

Example 3

Electrolyte membranes in which a polybenzimidazole was impregnated with 210 wt % of a vinylphosphonic acid were manufactured as follows: A polybenzimidazole represented by (e) of Formula 2 below was dissolved in N,N-diacetamide to obtain a polymer solution containing 10 wt % of the polybenzimidazole. The polymer solution was cast onto glass substrates and heated at 150° C. for five hours to remove the organic solvent. As a result, polymer membranes were obtained.

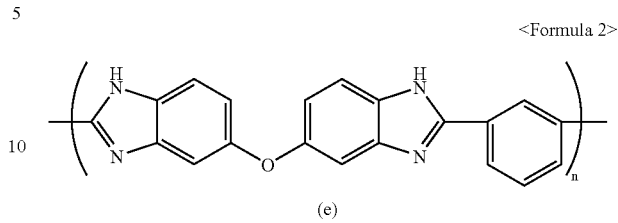

<Formula 2>

(e)

wherein n is 340.

The polymer membranes were impregnated with a vinylphosphonic acid having a purity of 85 wt % and that had been heated at 120° C., for one hour to thereby manufacture electrolyte membranes.

The dimensional change of the electrolyte membranes were 2% as measured. Durability tests of the electrolyte membranes were also performed. The endurance time of the electrolyte membranes was 800 hours.

Example 4

Electrolyte membranes in which a polybenzimidazole was impregnated with 100 wt % of an ethylphosphonic acid were manufactured as follows: 10 parts by weight of 1,4-butanediol diglycidyl ether were added to a solution of 10 wt % of poly-2,5-benzimidazole represented by (c) of Formula 1 in N,N-diacetamide to obtain a mixed solution. The mixed solution was cast onto glass substrates and heated at 150° C. for five hours to remove the organic solvent and to induce a crosslinking reaction. As a result, polymer membranes were obtained. The polymer membranes were impregnated with an ethylphosphonic acid having a purity of 85 wt % and that had been heated at 120° C., for five hours to thereby manufacture electrolyte membranes.

The dimensional change of the electrolyte membranes was 0% as measured. Durability tests of the electrolyte membranes were also performed. The endurance time of the electrolyte membranes was 1,000 hours or more.

Example 5

Electrolyte membranes in which a polybenzimidazole crosslinked by 3-glycidyl oxypropyl trimethoxysilane used as a crosslinking agent was impregnated with 150 wt % of an orthophosphoric acid were manufactured as follows: 5 parts by weight of 3-glycidyl oxypropyl trimethoxysilane were added to a solution of 10 wt % of a polybenzimidazole represented by (f) of Formula 3 below in N,N-diacetamide to obtain a mixed solution.

The mixed solution was incubated at 80° C. for two hours to induce an addition reaction, thus obtaining a polymer solution. The polymer solution was cast onto glass substrates and heated at 150° C. for five hours to induce a hydrolysis and condensation reaction, thus removing the organic solvent. As a result, polymer membranes were obtained.

<Formula 3>

(f)

wherein n is 340.

The polymer membranes were impregnated with an orthophosphoric acid having a purity of 85 wt % at room temperature for one hour to thereby manufacture electrolyte membranes.

The dimensional change of the electrolyte membranes was 1% as measured. Durability tests of the electrolyte membranes were also performed. The endurance time of the electrolyte membranes was 900 hours.

Example 6

Electrolyte membranes in which a polybenzimidazole was impregnated with 210 wt % of a vinylphosphonic acid were manufactured as follows: A polybenzimidazole represented by (g) of Formula 4 below was dissolved in N,N-diacetamide to obtain a polymer solution containing 10 wt % of the polybenzimidazole. The polymer solution was cast onto glass substrates and heated at 150° C. for five hours to remove the organic solvent. As a result, polymer membranes were obtained.

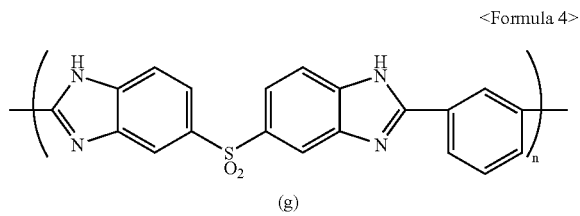

<Formula 4>

(g)

wherein n is 180.

The polymer membranes were impregnated with a vinylphosphonic acid having a purity of 85% and that had been heated at 120° C., for one hour to thereby manufacture electrolyte membranes.

The dimensional change of the electrolyte membranes was 1% as measured. Durability tests of the electrolyte membranes were also performed. The endurance time of the electrolyte membranes was 850 hours.

Comparative Example 1

Electrolyte membranes in which a polybenzimidazole was impregnated with 350 wt % of an orthophosphoric acid were manufactured as follows: Poly-2,2'-(m-phenylene)-5,5'-bibenzimidazole represented by (a) of Formula 1 was dissolved in N,N-diacetamide to obtain a polymer solution containing 10 wt % of the poly-2,2'-(m-phenylene)-5,5'-bibenzimidazole. The polymer solution was cast onto glass substrates and heated at 150° C. for five hours to remove the organic solvent. As a result, the polymer membranes were obtained. The polymer membranes were impregnated with an orthophosphoric acid having a purity of 85 wt % at room temperature for one hour to thereby manufacture electrolyte membranes.

The dimensional change of the electrolyte membranes was 10% as measured. Durability tests of the electrolyte membranes were also performed. The endurance time of the electrolyte membranes was 300 hours.

Comparative Example 2

Electrolyte membranes in which a polybenzimidazole was impregnated with 150 wt % of an orthophosphoric acid were manufactured as follows: A polybenzimidazoles represented by (h) of Formula 5 was dissolved in N,N-diacetamide to obtain a polymer solution containing 10 wt % of the polybenzimidazole. The polymer solution was cast onto glass substrates and heated at 150° C. for two hours to remove the organic solvent. As a result, polymer membranes were obtained.

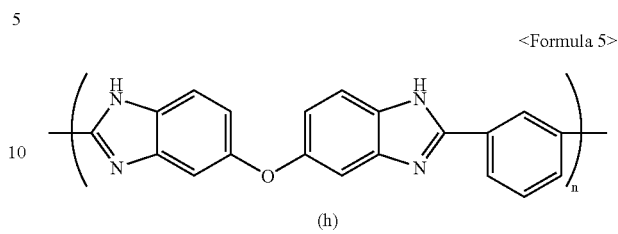

<Formula 5>

(h)

wherein n is 340.

The polymer membranes were impregnated with an orthophosphoric acid having a purity of 85 wt % at room temperature for one hour to thereby manufacture electrolyte membranes.

The dimensional change of the electrolyte membranes was 9% as measured. Durability tests of the electrolyte membranes were also performed. The endurance time of the electrolyte membranes was 200 hours.

According to aspects of the present invention, there is provided a polymer electrolyte membrane for a fuel cell that can maintain a stable performance for a long time. When a membrane and electrode assembly includes the polymer electrolyte membrane, it is possible to manufacture a fuel cell capable of maintaining a stable performance for a long time.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A polymer electrolyte membrane for a fuel cell, the polymer electrolyte membrane comprising an acidic dopant and a basic polymer crosslinked by an epoxy group-containing alkoxysilane or a derivative thereof, wherein a dimensional change in a planar direction of the polymer electrolyte membrane between a wet state and a dry state is 5% or less.

2. The polymer electrolyte membrane of claim 1, wherein the basic polymer comprises a polybenzimidazole or a derivative thereof crosslinked by the epoxy group-containing alkoxysilane or a derivative thereof.

3. The polymer electrolyte membrane of claim 2, wherein the polybenzimidazole is represented by at least one of polymers (a)-(d) of Formula 1 below:

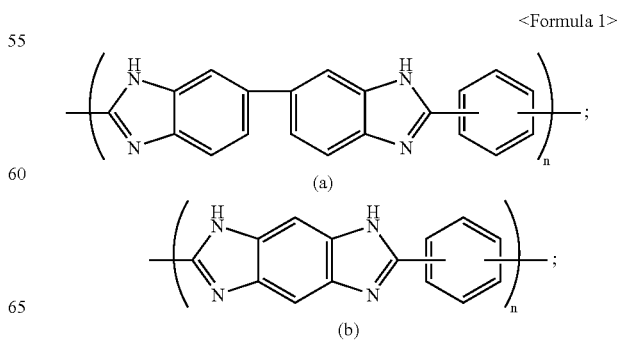

<Formula 1>

(a)

(b)

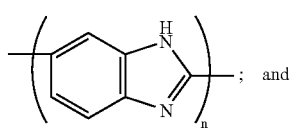

(c)

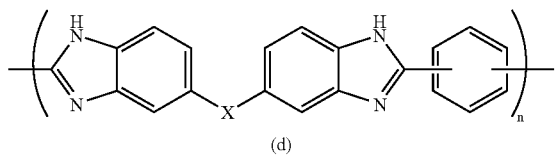

(d)

wherein n represents the number of repeating units and is 10 to 100,000 and wherein in (d), X is at least one selected from the group consisting of —O—, —SO$_2$—, —S—, —CO—, —C(CH$_3$)$_2$—, and —C(CF$_3$)$_2$—.

4. The polymer electrolyte membrane of claim 1, wherein the acidic dopant comprises a phosphoric acid or an organic phosphonic acid.

5. The polymer electrolyte membrane of claim 2, wherein the polybenzimidazole is polymer (f) of Formula 3 and the epoxy group-containing alkoxysilane is 3-glycidyl oxypropyl trimethoxysilane <Formula 3>

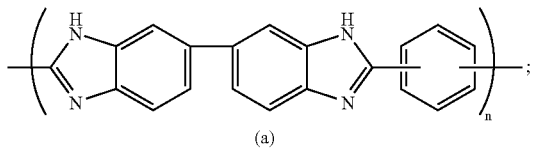

(f)

wherein n is 10 to 100,000.

6. A membrane electrode assembly comprising a pair of catalyst layers and an electrolyte membrane disposed between the catalyst layers, the electrolyte membrane being the polymer electrolyte membrane of claim 1.

7. A fuel cell comprising a plurality of membrane electrode assemblies, each membrane electrode assembly comprising a pair of catalyst layers and an electrolyte membrane disposed between the catalyst layers, the electrolyte membrane being the polymer electrolyte membrane of claim 1.

8. The fuel cell of claim 7, wherein the basic polymer of the polymer electrolyte membrane comprises polybenzimidazole or a derivative thereof.

9. The fuel cell of claim 8, wherein the polybenzimidazole is represented by at least one of polymers (a)-(d) of Formula 1 below:

<Formula 1>

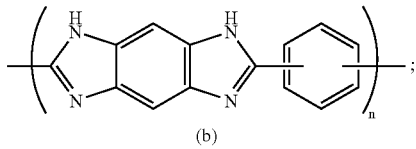

(a)

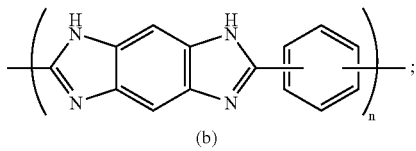

(b)

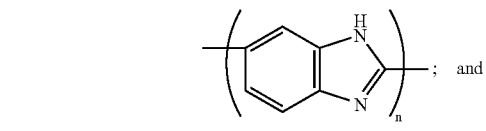

(c)

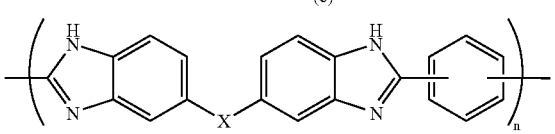

(d)

wherein n represents the number of repeating units and is 10 to 100,000 and wherein in (d), X is at least one selected from the group consisting of —O—, —SO$_2$—, —S—, —CO—, —C(CH$_3$)$_2$—, and —C(CF$_3$)$_2$—.

10. The fuel cell of claim 7, wherein the basic polymer of the polymer electrolyte membrane comprises a polybenzimidazole crosslinked by the epoxy group-containing alkoxysilane or a derivative thereof.

11. A method of manufacturing a polymer electrolyte membrane for a fuel cell, the method comprising:

adding a basic polymer and a polyfunctional crosslinking agent to an organic solvent and introducing the polyfunctional crosslinking agent into the basic polymer to obtain a polymer solution including the polyfunctional crosslinking agent-containing basic polymer, wherein the polyfunctional crosslinking agent is an epoxy group-containing alkoxysilane or a derivative thereof;

removing the organic solvent from the polymer solution and performing a condensation reaction of the polyfunctional crosslinking agent so that the basic polymer is crosslinked to obtain a polymer membrane; and impregnating the polymer membrane with an acidic dopant at room temperature to 200° C. to obtain a polymer electrolyte membrane.

12. The method of claim 11, wherein the basic polymer comprises a polybenzimidazole or a derivative thereof.

13. The method of claim 12, wherein the polybenzimidazole is represented by at least one of polymers (a)-(d) of Formula 1 below:

<Formula 1>

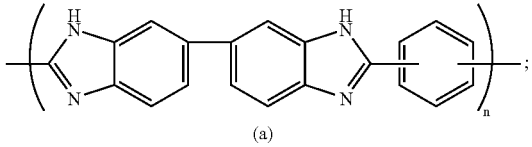

(a)

(b)

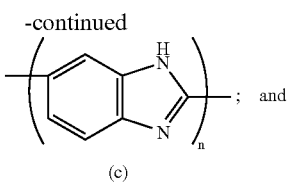

(c)

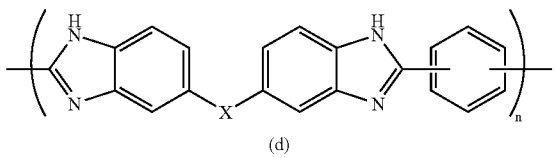

(d)

wherein n represents the number of repeating units and is 10 to 100,000 and wherein in (d), X is at least one selected from the group consisting of —O—, —SO$_2$—, —S—, —CO—, —C(CH$_3$)$_2$—, and —C(CF$_3$)$_2$—.

14. The method of claim 12, wherein the introducing of the polyfunctional crosslinking agent into the basic polymer comprises reacting an epoxy group of the epoxy group-containing alkoxysilane with a main chain of the polybenzimidazole.

15. The method of claim 12, wherein the polybenzimidazole is polymer (f) of Formula 3 and the epoxy group-containing alkoxysilane is 3-glycidyl oxypropyl trimethoxysilane

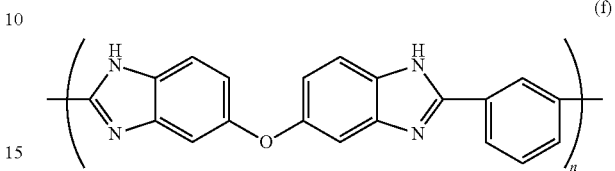

wherein n is 10 to 100,000.

* * * * *